US007839511B2

(12) United States Patent
La Rosa Ducato et al.

(10) Patent No.: US 7,839,511 B2
(45) Date of Patent: Nov. 23, 2010

(54) METHOD, SYSTEMS OF DEVICES, AND COMPUTER PROGRAM PRODUCT FOR THE DOCUMENT-RELATED EXTENSION OF A RESOURCE-STRUCTURED DOCUMENT DATA FLOW

(75) Inventors: José La Rosa Ducato, Erding (DE); Torsten Clausen, Markt Schwaben (DE); Cam Hung Mach, Erding (DE)

(73) Assignee: Oce Printing Systems GmbH, Poing (DE)

( * ) Notice: Subject to any disclaimer, the term of this patent is extended or adjusted under 35 U.S.C. 154(b) by 1241 days.

(21) Appl. No.: 10/522,610

(22) PCT Filed: Jul. 30, 2003

(86) PCT No.: PCT/EP03/08439

§ 371 (c)(1),
(2), (4) Date: Aug. 1, 2005

(87) PCT Pub. No.: WO2004/013748

PCT Pub. Date: Feb. 12, 2004

(65) Prior Publication Data

US 2006/0136442 A1    Jun. 22, 2006

(30) Foreign Application Priority Data

Aug. 1, 2002    (DE)    ................................ 102 35 254

(51) Int. Cl.
*G06F 3/12* (2006.01)
*G06F 17/00* (2006.01)
*G06F 17/21* (2006.01)
*G06K 15/00* (2006.01)
*H04N 1/00* (2006.01)
*H04N 1/60* (2006.01)

(52) U.S. Cl. .................... 358/1.13; 358/1.18; 358/1.6; 358/1.9; 715/243; 715/274; 715/249; 715/253

(58) Field of Classification Search ................ None
See application file for complete search history.

(56) References Cited

U.S. PATENT DOCUMENTS 4,870,611 A * 9/1989 Martin et al. ............... 715/209

(Continued)

FOREIGN PATENT DOCUMENTS

DE    100 24 523    11/2001

(Continued)

OTHER PUBLICATIONS

IBM AFP Programming Guide and Line Data Reference May 2001.*

(Continued)

*Primary Examiner*—Edward L. Coles
*Assistant Examiner*—Hilina S Kassa
(74) *Attorney, Agent, or Firm*—Schiff Hardin LLP

(57) ABSTRACT

In a method and system for enhancement of an input document data stream which comprises at least one input format file comprising format definitions and an input document data file structured in at least one of ranges and sub-ranges and containing variable data, the data stream is enhanced with finishing commands. In a control file, defining level structures that correspond to at least one of the ranges and sub-ranges of the input document data file. In a control file, associating the finishing commands with levels. Using the control file, the input format file and the input document data file the following are automatically generated by a computer program module.
  a) an output format file that contains the finishing commands in callable groups, and
  b) an output document data file containing the variable data and group calls associated by at least one of range-by-range and sub-range-by-sub-range.

17 Claims, 7 Drawing Sheets

U.S. PATENT DOCUMENTS

| | | | |
|---|---|---|---|
| 5,228,118 A * | 7/1993 | Sasaki | 358/1.13 |
| 5,680,615 A * | 10/1997 | Marlin et al. | 707/103 R |
| 5,727,220 A * | 3/1998 | Hohensee et al. | 715/234 |
| 5,768,488 A | 6/1998 | Stone et al. | |
| 5,982,997 A * | 11/1999 | Stone et al. | 358/1.15 |
| 6,119,117 A * | 9/2000 | Yoda et al. | 715/200 |
| 6,137,967 A | 10/2000 | Laussermair et al. | 399/16 |
| 7,031,001 B2 * | 4/2006 | Nakagiri et al. | 358/1.1 |
| 7,207,069 B2 * | 4/2007 | Foster et al. | 726/30 |
| 7,218,411 B2 * | 5/2007 | Hohensee et al. | 358/1.15 |
| 7,633,638 B2 * | 12/2009 | Ducato | 358/1.15 |
| 2001/0043352 A1 * | 11/2001 | Brossman et al. | 358/1.13 |
| 2001/0043365 A1 | 11/2001 | Kremer et al. | |
| 2002/0131075 A1 | 9/2002 | Kremer | |
| 2004/0036902 A1 * | 2/2004 | Ducato | 358/1.13 |
| 2004/0135805 A1 * | 7/2004 | Gottsacker et al. | 345/751 |
| 2004/0139115 A1 * | 7/2004 | Schmidt et al. | 707/104.1 |
| 2004/0236713 A1 * | 11/2004 | Silbersack et al. | 707/1 |
| 2004/0239981 A1 * | 12/2004 | Ducato et al. | 358/1.15 |

FOREIGN PATENT DOCUMENTS

| | | |
|---|---|---|
| EP | 1 139 275 | 10/2001 |
| EP | 1 156 411 | 11/2001 |
| WO | WO 01/77807 | 10/2001 |
| WO | WO 02/093356 | 11/2002 |

OTHER PUBLICATIONS

IBM Data Stream and Object Architectures MO:DCA Apr. 2001.*
Termine Nachrichten Neuheiten Aug. 1999.
IBM Data Stream and Object Architectures Apr. 2001.
IBM Advanced Function Presentation May 2001.
Das Druckerbuch Gerd Goldmann May 2001.
UP31-Homepage Universal Printer, Pre-and Postprocessing Interface Jan. 21, 2005.
IBM Page Printer Formatting Aid: User's Guide May 2002.

* cited by examiner

METHOD, SYSTEMS OF DEVICES, AND COMPUTER PROGRAM PRODUCT FOR THE DOCUMENT-RELATED EXTENSION OF A RESOURCE-STRUCTURED DOCUMENT DATA FLOW

BACKGROUND

The invention concerns a method, a device system and a computer program product for processing of a document data stream that contains structured fields. A typical document data format of this type is the format AFP™ (advanced function presentation). It is in particular used in electronic print production environments, i.e. in data processing and printing systems that process document data with a speed of up to a few thousand pages per minute.

Such document production systems exhibit a high degree of automation. For example, a printing system with integrated quality checking is specified in U.S. Pat. No. 6,137,967.

Various print data streams and printing systems are, for example, specified in the publication "Das Druckerbuch", Dr. Gerd Goldmann (editor), Océ Printing Systems GmbH, 6th edition (May 2001), ISBN 3-000-00 1019-X. The server system Océ PRISMApro is specified in chapter 14. This flexible print data server system is, for example, suited to transfer print data from data sources such as a source computer—the print data in a specific print data language such as line data, AFP, PCL (Printer Command Language), PostScript, SPDS (Siemens Print Data Stream), or in the language LCDS developed by the company Xerox Corporation—to a print production system.

Details of the resource-structured document data stream AFP™ are specified in the publication Nr. S-544-3884-02, published by the company International Business Machines Corp. (IBM) with the title "AFP Programming Guide and Line Data Reference". This documentation is to be obtained via the address IBM Printing Systems Division, Dept. H7FE, Building 004M, Information Development, PO Box 1900, Boulder Colo. 80301-9191 USA or via \http://publib.boulder.ibm.com/prsys/pdfs/54438842. pdf.

The document data stream AFP was further developed into the resource-structured document data stream MO:DCA™, which is specified in the IBM publication SC31-6802-05 (April 2001) with the title "Mixed Object Document Content Architecture Reference". This document is also accessible at the Internet address http://publib.boulder.ibm.com/prsys/pdfs/c3168025.pdf. Details of this data stream, in particular the use of structured fields, are also specified in U.S. Pat. No. 5,768,488. In the framework of the present specification, no differentiation is made between AFP and MO:DCA data streams.

AFP/MO:DCA data streams are frequently converted into data streams of the format Intelligent Printer Data Stream™ (IPDS™) in the course of print production jobs and transferred to a high-capacity printer in this format. Such a process is shown in U.S. Pat. No. 5,982,997.

In the specification "UP$^3$I; Universal Printer Pre- and Post-Processing Interface," Version 1.02 (July 2002), published by the companies Duplo International Ltd., Hunkeler AG, IBM Corporation, Océ Printing Systems GmbH and Stralfors AB, which can be downloaded as a file at the Internet address www.up3i.org, the most varied control commands are provided that can be used in the creation of a printed document to control various devices of a print production system such as printing devices and devices upstream and downstream from these, such as unwinders, cutting devices, hole devices, gluing devices and binding devices. It is thereby provided that such data are exchanged between the different devices, thus for example between a paper dispenser and a printing device.

On the pages 134 through 141 of the UP$^3$I specification, examples are already cited as to how commands for print pre- and post-processing devices can be inserted into an AFP (MO:DCA) or IPDS data stream. With the UP$^3$I extensions, AFP applications can now contain UP$^3$I control commands that are transferred to a printer, whereby printer-specific data formats such as IPDS can be used. The UP$^3$I control data are thereby initially mixed with the print data and are only separated from these in the printer. The further devices of the print production system, i.e. pre- and post-processing devices for the print good (such as paper dispensers, unwinders, stackers, punchers, folders, cutters and binders), can then be addressed via the UP$^3$I interface.

New AFP applications can already be coded from the beginning such that UP$^3$I functions are used. This is different than in older AFP applications. Such applications for standard expressions (such as, for example accounting printouts or account statements), applied in part for many years, must be changed when they should use UP$^3$I functions.

From the IBM publication NR. S544-5284-06, "IBM Page Printer Formatting Aid: User's Guide", 7$^{th}$ edition, which is accessible at http://publib.boulder.ibm.com/prsys/pdfs/54452846.pdf, a tool is known with which a user can provide an existing AFP document data stream or a format definition resource file "Formdef" located in this document data stream with additional commands. This occurs via a control file in which it is entered when what is known as a copygroup or medium map with a specific name must be generated.

In this type of data enhancement, corresponding calls of the media map must respectively be stored in the file in which the variable data are situated in order to be able to let the commands generated in the formdef file act on the variable data. This manual reprogramming of the data stream can be a very complex event that is error-prone—primarily when a plurality (for example 3 or more) of copygroups are to be newly inserted. The effort thereby resulting for the user is substantial, and the danger of wrong inputs exists when media map calls are not correctly updated, for example not changed in synchronization with the entries in the formdef file.

Furthermore, it can occur that one and the same original data stream are processed with various print production systems, and this with various finishing possibilities. The application must then be re-adapted for the respective configuration of the print production system, which can lead to unwanted time delays under production conditions.

In the patent application Nr. PCT/EP02/05299, which the applicant submitted on 14 May 2002 with the title "Method, device system and computer program system for processing of document data", it is described how auxiliary data (such as, for example, barcodes) can be automatically inserted into a document data stream.

A conventional processing of an AFP print document data stream without support of finishing or UP$^3$I functionalities is shown in FIG. 2. The various processing steps show what an AFP application designer (user) has to do in order to create an application: by means of a formatting computer program 20 (which, for example, can be the previously mentioned Page Printer Formatting Aid (PPFA) tool by the company IBM or the Smart Layout Editor (SLE) specified in the Druckerbuch introduced above) and a control file 21 with corresponding formatting parameters, the user generates a formdef file (resource) 23 that contains a copygroup (medium map) with the name ACCOUNT.

A print data file 22 that contains variable data is prepared by the user such that it is called the copygroup which has been applied with the control file 21 with structured fields of the type invoice medium map (IMM) "IMM Account", which stands between the variable data. Details regarding the structured field type IMM can be learned from the previously cited IBM document SC31-6802-05.

In the example shown in FIG. 2, the print data file contains account statement documents for two different customers of a bank. For the first customer, the print data file 22 contains two account statements with respectively 9 pages and 6 pages. For the second customer, an account statement document with 3 pages should be printed out. For this, the print data file 22 and the formdef file 23 are supplied to a host printer driver 24 that (in step S3) forms a print data stream of the format IPDS from both files and, if applicable, resource files such as, for example, fonts, with which a print data stream an IPDS-capable printing system 25 is activated. In the illustrated example, the printing system 25 is controlled from a first printer 26 in which the front side of a web-form recording medium is printed and a second printer 27 in which the back side of the same recording medium is printed with the respectively associated data.

In step S4, the previously cited documents are printed out, i.e. as a first document 28 of the first printout of the first customer that comprises five individual pages, three pages as a second document 29 for the first customer with the second account statement, and two pages as a third document 30 for the second customer.

The same application as shown in FIG. 1 is shown in FIG. 3, whereby it is manually extended with additional commands for print pre- or post-processing devices as they are provided in the UP$^3$I specification. In the case of FIG. 3, the finishing commands shrink-wrapping (shrink-wrap), page offset (left/right/shift) as well as document stapling (corner staple) are provided that should be applied on the printed print good or parts thereof. Using FIG. 3, it is described which operating steps are necessary when this goal is executed with the already specified tool by the company IBM, "Page Printer Formatting Aid" (PPFA) or with the Smart Layout Editor (SLE) known from the applicant.

In step S5, a new form definition file is generated by the user as a resource file with the Page Printer Formatting Aid tool (see above) or with the tool Small Layout Editor (SLE) that is specified in the previously introduced "Druckerbuch" by Océ Printing Systems GmbH. The parameters are specified in a PPFA control file 31 (in FIG. 3, the control file 31 is subdivided into a first part 31a and a second part 31b merely for representation reasons). The control file 31 shows that three copygroups (medium map fields) are necessary in order to be able to activate the desired finishing functions. The UP$^3$I control commands for the welding, the offset, and the stacking are part of the new medium map, for example OPERATION SHIFT and REFERENCE left for the offset.

The PPFS control file 31 generated in the step S5 uses the PPFA computer program 32 in order to generate in the step S6 a formdef file in which are contained the copygroups (LI_ACC1, LI_ACC2 and RI_ACC1) defined in the PPFA control file 31. These new medium maps replace the copygroup (medium map) ACCOUNT contained in the formdef file 23 in FIG. 1.

In addition to the changes in the formdef file 23, the user must modify the print data file such that the structured fields Invoice Medium Map (IMM) are synchronized with the new medium map names. The user must thereby replace the respective old IMM call with a correct new IMM call that corresponds to the respective desired finishing operations. In the example of FIGS. 2 and 3, different calls are henceforth inserted in place of the respective identical calls 22a, 22b and 22c "ACCOUNT" for the three documents 28, 29, 30: the call IMM LI_ACC1 34a, whereby the document is distributed and stapled to the left, is to be added to the document 28 and the call IMM LI_ACC2 34b, whereby the document is deposited and stapled to the left, is to be added to the document 29. The call RI_ACC1 is to be added for the document 30, whereby the document is deposited and stapled to the right. This association must occur manually in the print data file when the print data file exists already or has the structure 22 shown in FIG. 1. Otherwise, the print data file would have to be completely newly generated via a corresponding application program, which is, however, very time-consuming under the circumstances. For synchronization, it is thus necessary that copygroups a) are present, b) have matching parameters for formdef file in the data stream and c) their calls are situated at precisely the right point of the print data stream.

In step S8, the formdef file 3 and the print data file 34 are in turn converted by the host printer driver 24 from the AFP format into an IPDS print data stream and sent to the IPDS-capable printing system 25. The commands, which apply to the pre- or post-processing devices (UP$^3$I commands) and that are contained in the medium map, are converted into corresponding IPDS/UP$^3$I triplets before they are sent to the printer. As already in FIG. 2, the resulting printed documents 28, 29, 30 are grouped, whereby in the case of FIG. 3 the pages are stapled and shifted group-by-group, and all are shrink-wrapped together in a protective covering as this has been specified by the user.

The labeled bars 35, 36 show the respective post-processing steps of the ancillary documents.

A user that would like to extend an AFP print data stream with post-processing functionalities (for example UP$^3$I) with the method shown in FIG. 3 must have the original PPFS control file available and furthermore have access to the user program that has generated the original print data stream. However, this is not always given. It is therefore a requirement to expand existing AFP print data streams with additional device functionalities in order to enable an optimally automated process for generation of more complex documents without having to access old control files or user programs that were decisive in the generation of the data stream.

To recapitulate, it is to be established that the user must implement at least the following steps in the method shown according to FIG. 3:

a) He must change existing copygroups which contain a finishing operation. Tools such as the computer program PPFA are available for this.

b) He must add new copygroups that are respectively situated at the beginning of a finishing operation or indicate their continuation and c) he must modify the print data stream in order to call the modified or inserted medium maps (copygroups).

The steps cited above are all the more elaborate the larger the respective application, i.e. the more documents that are contained in the application and/or the more medium maps/copygroups that are contained in the formdef file. Typical AFP applications are comprised of multiple thousands (up to hundreds of thousands) of pages. A typical AFP formdef file contains a plurality of medium maps, for example in what is known as a mixplex job, in which various paper feeder bays and/or simplex/duplex print commands alternate within a print job. Effort and susceptibility to error are therefore very high under the circumstances given the preparation of such print data streams.

Possibilities for insertion of information into a MO:DCA data stream are specified in U.S. Pat. No. 5,768,488. Furthermore, in the article PrePress, published 8/99, pg. 18-27, it is specified that the host input module of the program "Hausdruckerei Manager", vers. 6.1 by the system vendor Danka allows the addition of information that are not contained in AFP/IPDS data streams, for example commands for duplex printing and end processing.

A method for enhancement of a document data stream with data for peripheral devices is known from DE 100 24 523 A1.

From the document EP-A-1 139 275, it is known to search through a GDI print data stream for address data that are extracted from this print data stream. The extracted data are subsequently re-supplied to the data stream.

From the document EP-A-1 156 411, it is known to create an electronic job ticket with whose help a print data stream is generated from unprintable data that comprises the templates and text data.

From the document WO 01/77807 A2, a method and system for processing of a print data stream are known that converts a print data stream of a first data format into a print data stream of a second standardized format.

The previously cited publications and patent applications are herewith incorporated by reference into the present specification.

SUMMARY

It is an object to automate the insertion of finishing operations into existing structured document data streams.

In a method and system for enhancement of an input document data stream which comprises at least one input format file comprising format definitions and an input document data file structured in at least one of ranges and sub-ranges and containing variable data, the data stream is enhanced with finishing commands. In a control file, defining level structures that correspond to at least one of the ranges and sub-ranges of the input document data file. In a control file, associating the finishing commands with levels. Using the control file, the input format file and the input document data file the following are automatically generated by a computer program module:

a) an output format file that contains the finishing commands in callable groups, and
b) an output document data file containing the variable data and group calls associated by at least one of range-by-range and sub-range-by-sub-range.

DESCRIPTION OF THE PREFERRED EMBODIMENT

Figure 1:
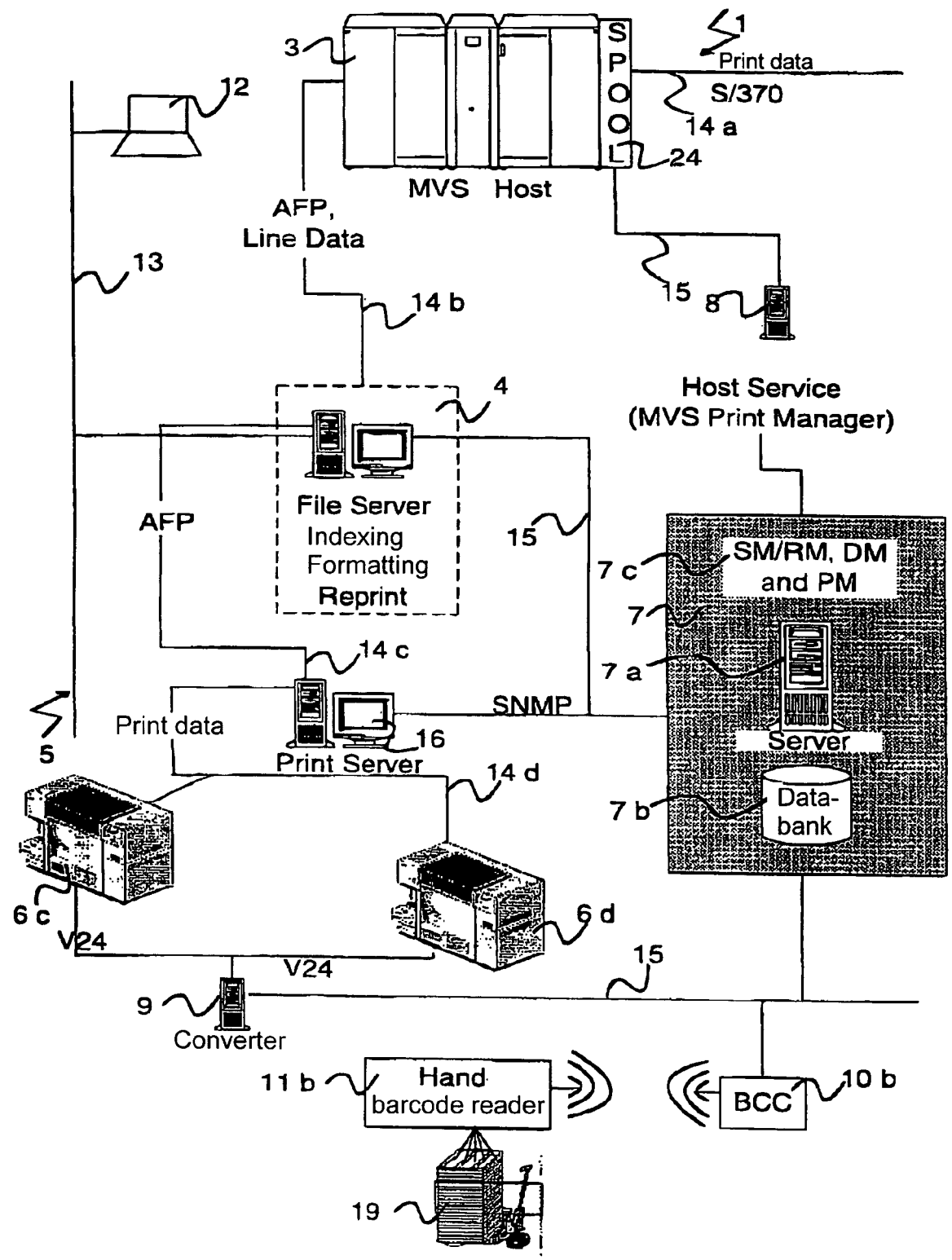
FIG. 1 shows a high-capacity printer system.
Figure 1A:
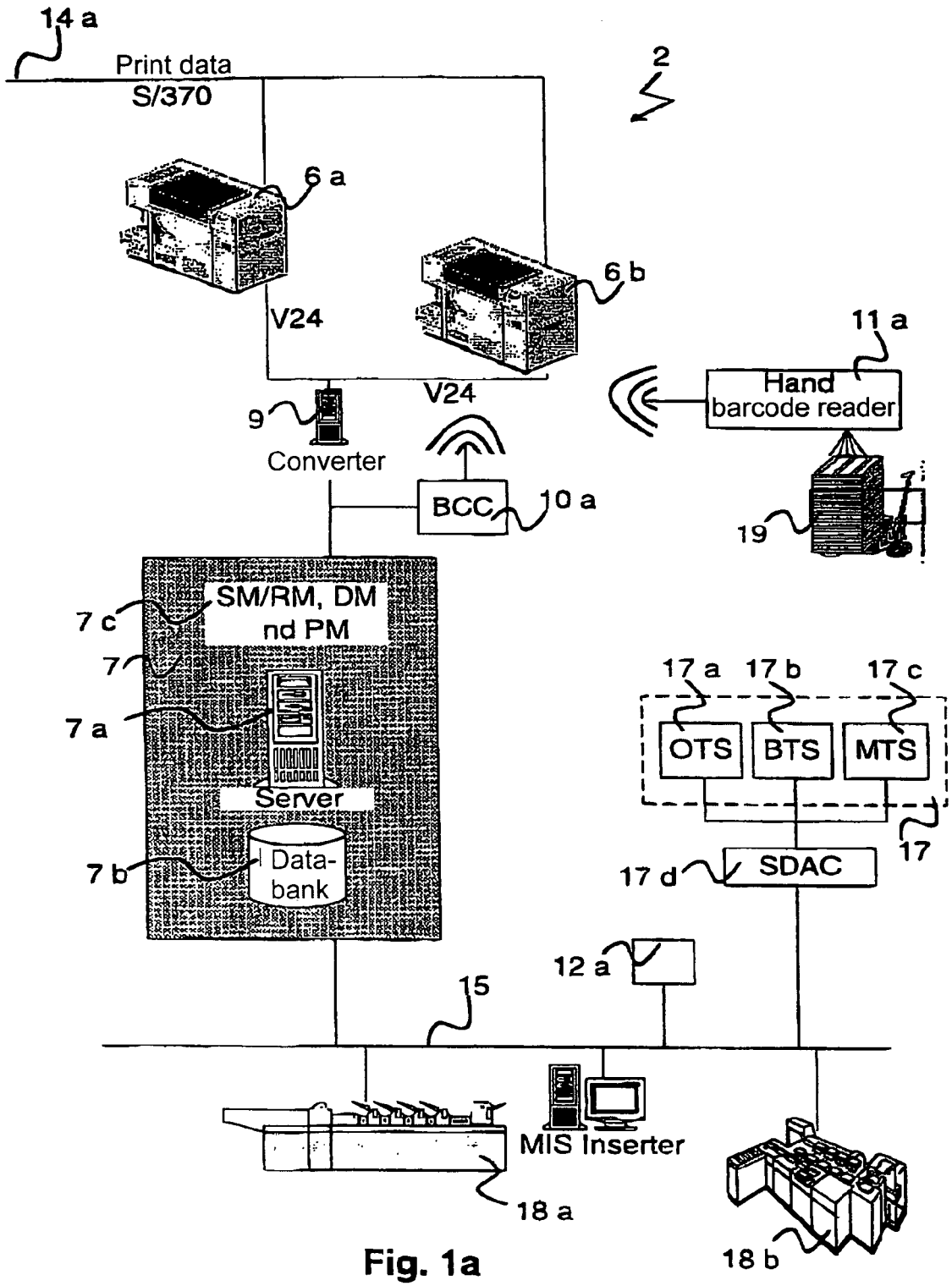

For the purposes of promoting an understanding of the principles of the invention, reference will now be made to the preferred embodiment illustrated in the drawings and specific language will be used to describe the same. It will nevertheless be understood that no limitation of the scope of the invention is thereby intended, such alterations and further modifications in the illustrated device, and/or method, and such further applications of the principles of the invention as illustrated therein being contemplated as would normally occur now or in the future to one skilled in the art to which the invention relates.

To enhance with finishing commands an input document data stream that comprises at least one input format file containing format definitions as well as an input document file structured in ranges and/or sub-ranges and containing variable data, it is provided that a control file is applied in which the level structures are defined that correspond to the ranges and/or the sub-ranges of the input document file. Furthermore, in the control file the finishing commands are associated with the levels, such that the following files can be automatically generated with a computer program module using the control file, the input format file and the input document file:

(a) an output format file that contains the finishing commands in callable groups, and
(b) an output document file containing the variable data and group calls associated range-by-range or sub-range-by-sub-range.

One advantage of the preferred embodiment with regard to conventional methods is that the user does not need to modify existing print production jobs himself. In particular AFP applications can generate print data entirely independent of the site and the type of their printout. Additional finishing commands for devices for pre- or post-processing of print goods in the print production process are extended in a data enhancement process with new or existing print data streams, which in particular can occur in a production-in-time event just before the print job is actually processed. Via the automation of the event to the greatest possible extent, a data enhancement process can be rapidly triggered, whereby the process speed can be between 10,000 and 50,000 pages per minute. A complete, immense print job can thereby be prepared within only a few minutes, such that it can fully or partially use the capabilities of a print production path with complex design. In addition to the enhancement of print data with finishing commands, the data can be enhanced (in particular via the same computer program module) with further control data more or less independent of the print path, for example with franking data for postal shipments or with barcode data for detection of generated documents in later method steps. For this, the preferred embodiment can in particular be combined with the method or system of the previously cited PCT/EP02/05299 in which, in a method, system or computer program for processing of a document data stream, a series of function stages are used in order to enable a fast, secure output of the documents in a production environment, in particular in a print production environment. The content of this patent application is herewith again explicitly referenced.

The preferred embodiment is based on the realization that, in a structured input data stream that should be enhanced with complex finishing commands, the existing document structure can be utilized, and via allocation of ranges or sub-ranges of the document data stream, a corresponding association of finishing commands range-by-range is possible. According to a further aspect of the preferred embodiment, for allocation a control file is provided in which document levels on which specific finishing commands should be applied are defined independent of the concrete structure of the document input file. This event can thus be automated very well and in particular be automatically prepared for large to very large print data streams (for example print data streams containing thousands to millions of documents).

A user who wants to expand a resource-structured document data stream with finishing operations is provided with a tool (computer program, editor) with which he can specify the finishing operations that are to be implemented. Parameters that more precisely specify the operation can hereby be provided. Furthermore, the user can specify the location and the range (or the levels) within the variable print data stream in which the finishing operation is to be applied. Furthermore, the necessary finishing commands (copygroups, medium maps) are automatically inserted into the format definition file (formdef) by a computer program module. Finally, the processing calls (medium map invocation) contained in the document data file containing variable data are modified or inserted such that the finishing operations (copygroups) incorporated into the format definition file are invoked instead of the original calls contained in the variable document data file.

Due to the high degree of automation of the replacement of prior processing calls with the supplemented calls with additional functionalities, errors are largely to be eliminated. Existing processes for generation of document data do not need to be modified. Since the user only needs to specify the new available finishing operation commands on a relatively simple interface (editor, graphical user interface GUI, computer program) and the insertion of corresponding calls into the document data file occurs automatically, even very complex and large document data files can be adapted to the new possibilities in the range of the pre-processing and post-processing of print goods with only slight effort of the operator.

In a preferred exemplary embodiment, the input document data streams and/or the resource-structured output document data stream are an Advanced Function Presentation™ data stream. With the preferred embodiment, it is thereby in particular possible to enhance other input document data streams such as, for example, line data, PCL data or Postscript data with finishing commands, if applicable to take over finishing commands already integrated there or to overwrite and/or to generate finishing commands on the output side in an Advanced Function Presentation™ data stream. It can be provided just as well in the reverse, that on the input side an Advanced Function Presentation™ data stream exists and this is to be converted at the output side into a different resource-structured output data stream.

A document print production system 1 is shown in FIG. 1 that on the one hand comprises a mainframe architecture 2 and on the other hand comprises a network architecture 5 in which document data or a document print data stream are respectively generated by means of user programs (tools). In the mainframe architecture, these print data are generated by a host computer 3, in particular as an AFP print data stream or as a line print data stream. The print data can alternatively be transferred directly from the host computer 3 to one or more print devices 6a, 6b via what is known as an S/370 channel 14a. As an alternative to this output channel, the print data can also be transferred from the host computer 3 to a processing computer 4 via a network 13 or a direct data connection 14b, in which processing computer 4 the print data are buffered (for example in an associated file server) and processed for subsequent output steps. In such host computers 3, in particular print data streams are generated that are assembled from larger data stocks (databanks) of regular list expressions, calculations, consumption overviews (for telephone accounting, gas accounting, bank accounts), etc. Such applications have frequently already been in use for many years and, as before, are necessary in a more or less unchanged manner (what are known as legacy applications).

The print production workflow is monitored by a monitoring system 7 within the mainframe architecture 2. The monitoring system 7 comprises a monitoring computer 7a that is coupled with a databank 7b and contains various computer program modules 7c (compare FIG. 2).

The monitoring system 7 is connected with the host computer 3 via a device controller network 15 and a print manager module 8 as well as via a converter 9 with a V24 data line that connects to both of the print devices 6a, 6b. The converter 9 converts the V24 signals into DMI protocol signals of the device controller network 15. SNMP protocol signals can be provided to the device manager DM converted as DMI protocol signals or can be directly passed as SNMP protocol signals.

Print product 19 that has been generated in the printers 6a, 6b from the document print data stream and on which barcodes are printed can be respectively scanned with a manually movable, radio-controlled barcode reader 11a. The signals are transferred via radio to the read station 10a and transferred into the device controller network 15 or to the monitoring system 7. Readers for one-dimensional and/or two-dimensional barcode systems can be used as barcode readers, such that various barcode systems can be read with one and the same read device. The barcode reader system is in particular configurable, i.e. adaptable to various application-specific codes or the respective suitable control methods.

Document data are generated in the network architecture 5 by means of user programs in client computers 12, 12a that are connected among one another via a client network 13 as well as with the processing computer (file server) 4. The file server thus serves as a central handling and processing interface for print data of the entire print production system 1. Diverse control modules (software programs) run on it, via which control modules the entire print production workflow or the entire document processing is optimally adapted to the respective conditions in a manner that is application-specific, production-related and takes place at the device controller.

In particular the following functions, which are specified more precisely in connection with subsequent Figures, are executed in the file server:

1. Converting Indexing Sorting

In this function, incoming print data are converted into a uniform data format, indexed according to predetermined parameters and re-sorted in a predetermined sorting sequence. This in particular enables the re-sorting of the data streams optimized for the subsequent document output, for example the merging of various pages that are not in succession in the input data stream to be sorted together into a mail piece, such that they can, for example, be enveloped together into a correspondence (for example in an enveloper 22b).

2. Insertion of Control Information

In this function, control information, in particular barcodes, are inserted into the data stream, using which control information a data group belonging together (for example page, sheet, document, mail piece) can be recognized as such and be unambiguously localized in the production process at the various processing stations.

3. Data Reduction

With this function, control data that have been delivered in the input data stream from the host computer 3 or user computer 12 to the processing computer 4 can be filtered to the effect that such control data that are not necessary in the given overall system arrangement are removed. Via the connection of all participating output devices (printer 6a through 6d, cutter 22a, enveloper 22b) via the device controller network 15, it can already be decided in the processing computer 4 which control data of the input data stream are needed by none of the connected devices. Via removal of this data from the data stream, the data stream can be reduced overall, in particular when only empty field entries regarding corresponding control data are contained in the input data stream.

4. Extraction

With this function, predetermined data can be filtered or separated out from the output data stream, whereby a compressed data stream (compressed data) is created, in particular for control and status data that can be exchanged with very high speed between the participating devices and the monitoring computer. It is thus possible to execute the monitoring of the participating devices in real time.

The functions 1.-4. can largely be automatically implemented by a computer program module "CIS" (Converting, Indexing and Sorting), which is gone into again in detail later.

Repeated Print (Reprint)

When, in the course of the further processing of the data, in particular in the output of the data on one of the print devices 6a, 6b, 6c or 6d, an error occurs in one of the post-processing devices 18a, 18b or also in the print computer 16, this can be determined by the monitoring system 7 using the control barcodes inserted into the processing computer 4, and the reprint of the documents (pages, sheets, mail pieces) affected by the fault can be requested. This reprint request is decisively controlled in the processing computer 4.

Print data that have been completed by the processing computer 4 are conveyed via the print data line 14c to a print server 16. Its task is essentially to unload the processing computer 4. This occurs via buffering of the completed print data until its recall via the data line 14d to one or both printers 6c, 6d. The print server 16 is thus integrated into the overall system predominantly for reasons of performance (speed). In systems whose print speed is less high, the print server 16 can also be foregone.

Document data that are transferred to the printers 6c or 6b and there are printed on a recording medium (for example paper) are, in the overall system, supplied to further processing steps, namely the cutter 18a and the enveloper 18b of the further processing. The print production process is therewith concluded.

The printed documents are tested with a test system 17 with regard to various criteria on their processing path between the print device 6 and the last post-processing device 18b, namely via an optical test system 17a with regard to their optical print quality, with a barcode test system 17b with regard to their existence, their consistency and/or their sequence, as well as with an MICR test system 17c insofar as the print was printed by means of magnetically-readable toner (magnetic ink character recognition toner). The data of the various test systems provided by the test system 17 are transferred from a mutual, serial data acquisition module (serial delta acquisition module) 17d to the device controller network 15 and supplied to the monitoring system 7. There the respective system data are acquired and the devices are checked in real time, and the respective positions of the documents are tested with regard to their correctness relative to the print job.

Further details of such a test system 17 are specified in the U.S. Pat. No. 6,137,967 or in the patent application corresponding thereto. The content of this patent or these patent applications are herewith incorporated by reference into the present specification.

The finished printed documents 23 can in turn be registered with a barcode reader 11b that is connected, radio-controlled, with an associated control device 10b, which in turn delivers its data to the monitoring system 7 via the device controller network 15.

Figure 2:
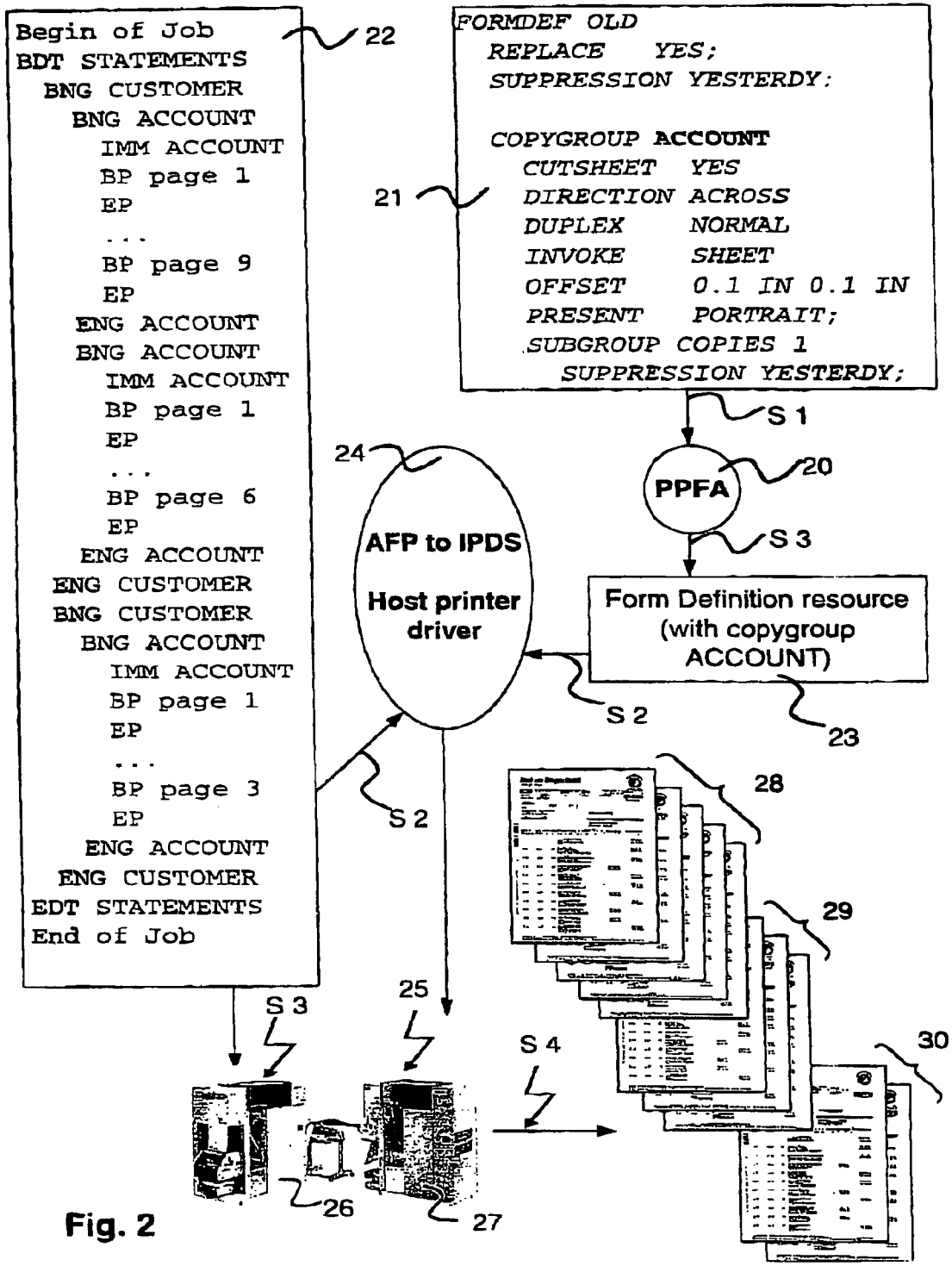
FIG. 2 shows a conventional technique for processing of a structured data stream.
Figure 3:
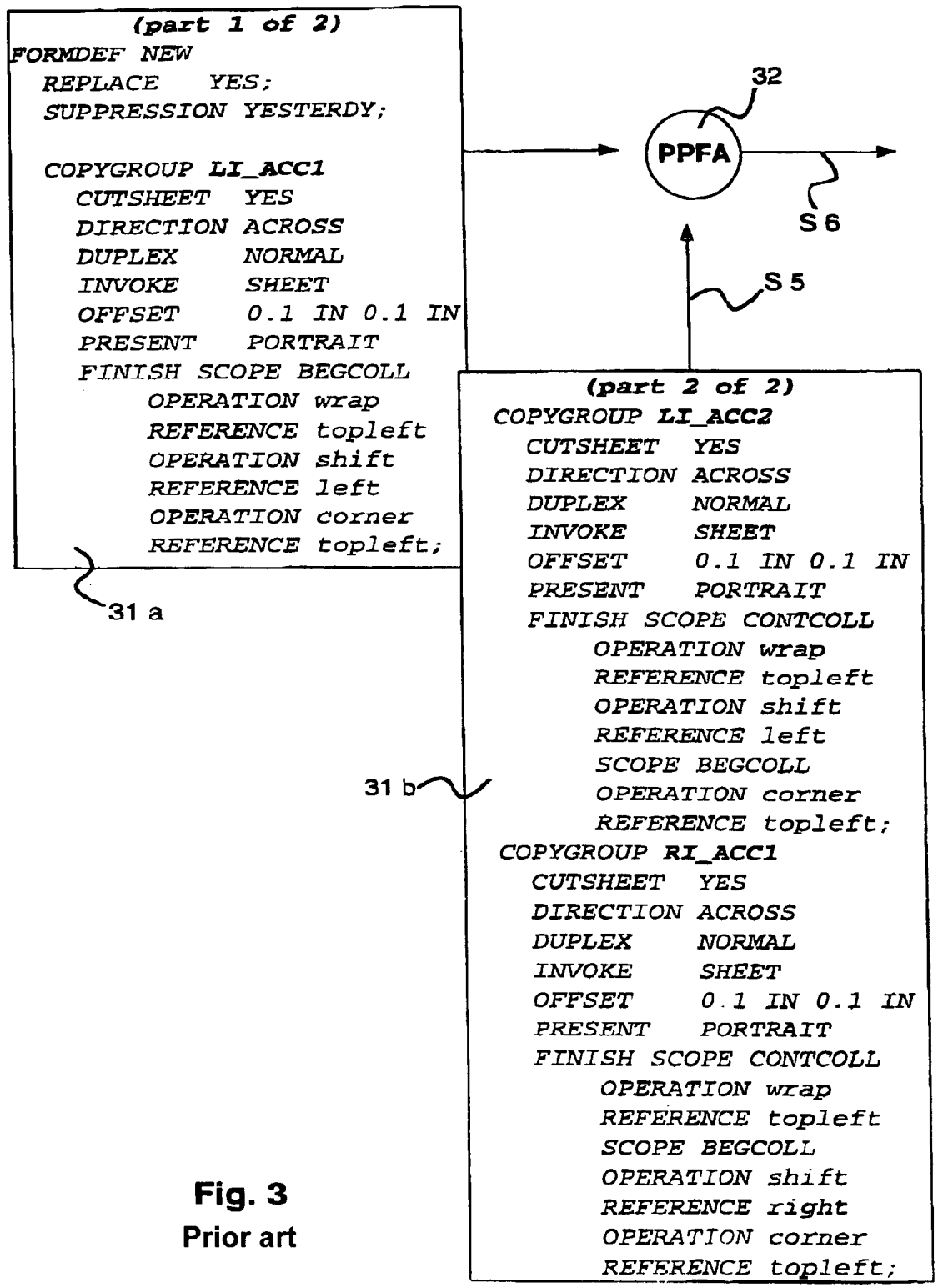
FIG. 3 illustrates a conventional technique for propagation of a structured data stream with finishing commands.
Figure 3A:
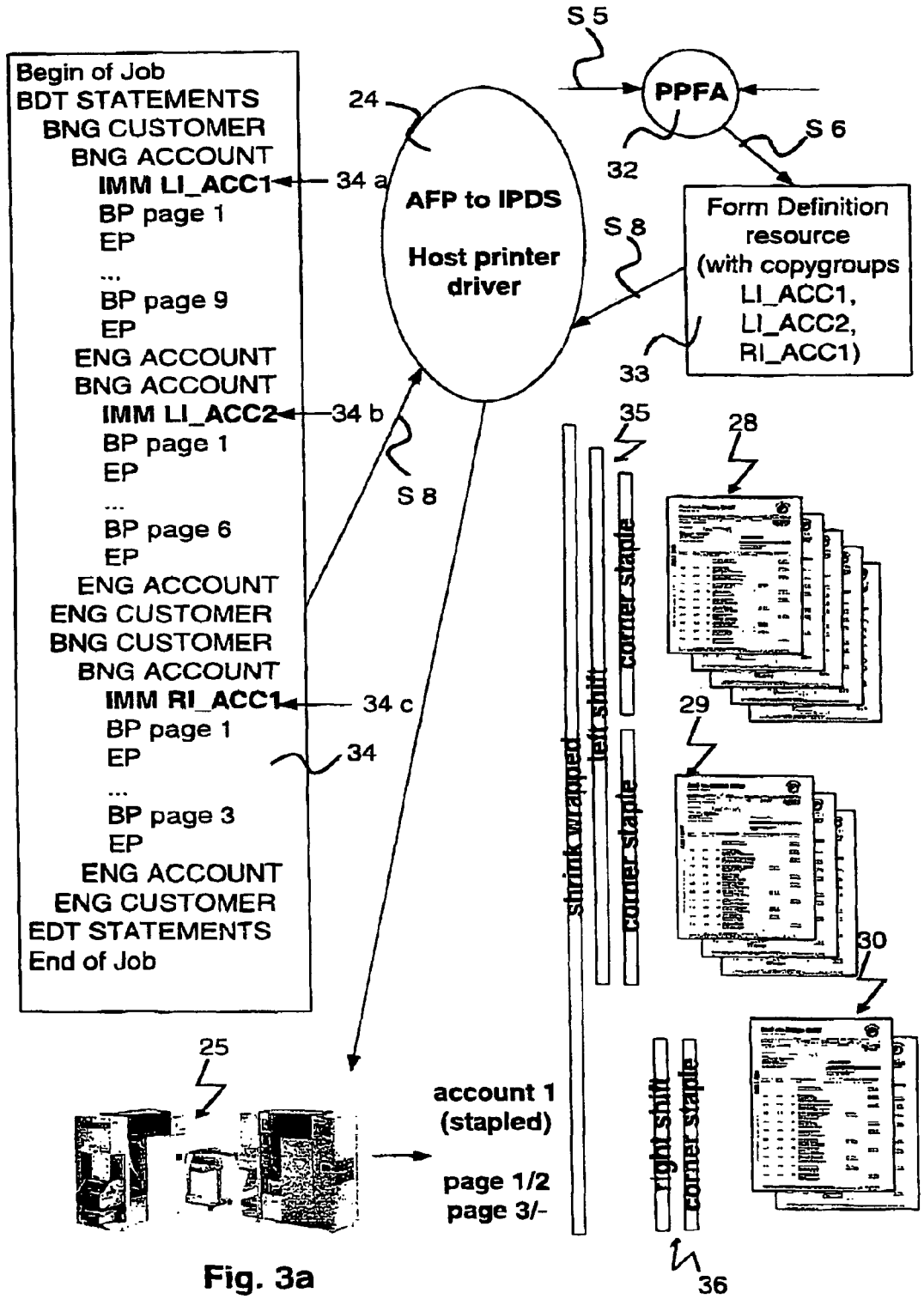
Figure 4:
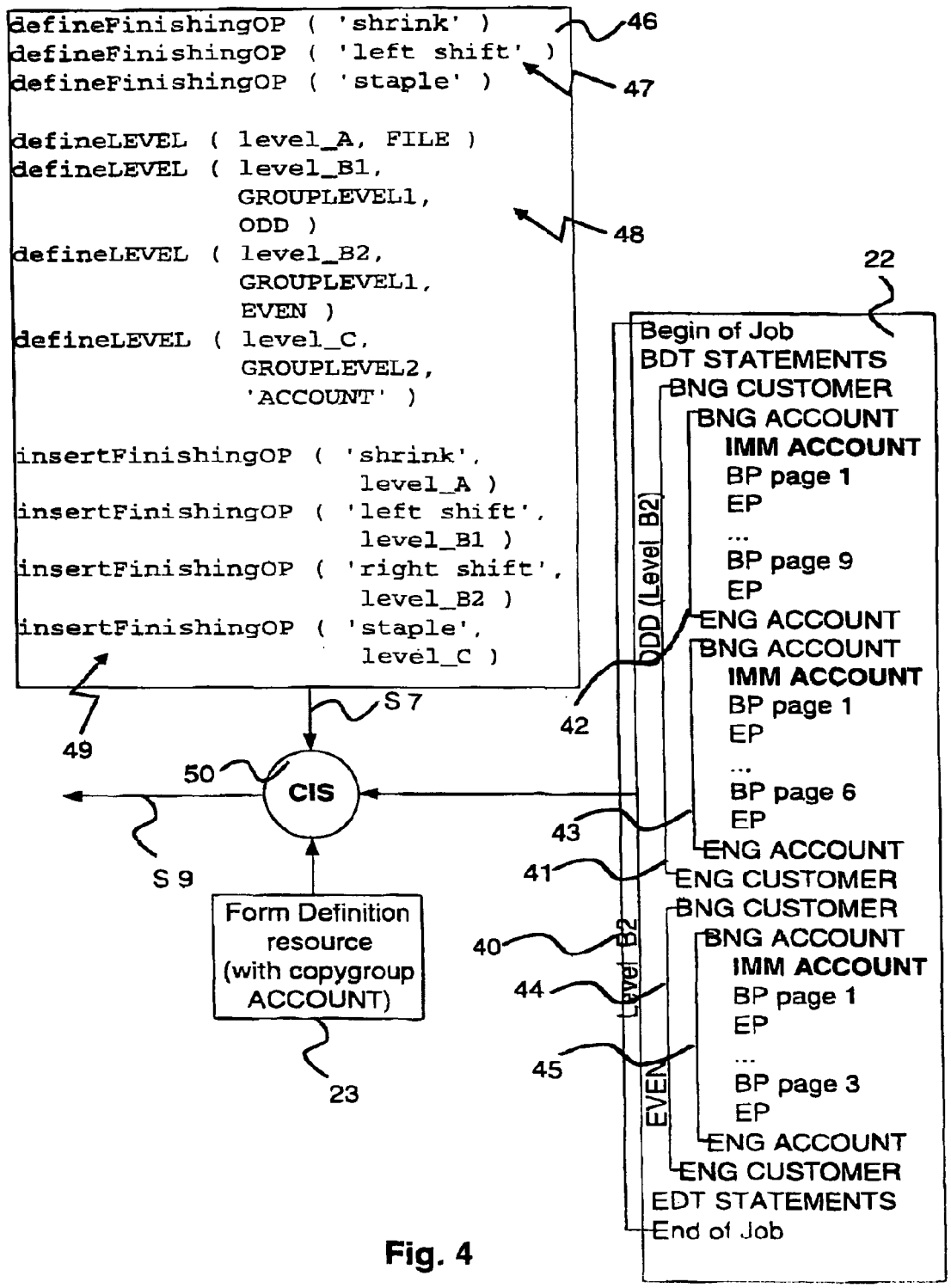
FIG. 4 shows a technique of the preferred embodiment for automated enhancement of a structured data stream with finishing commands.
Figure 4A:
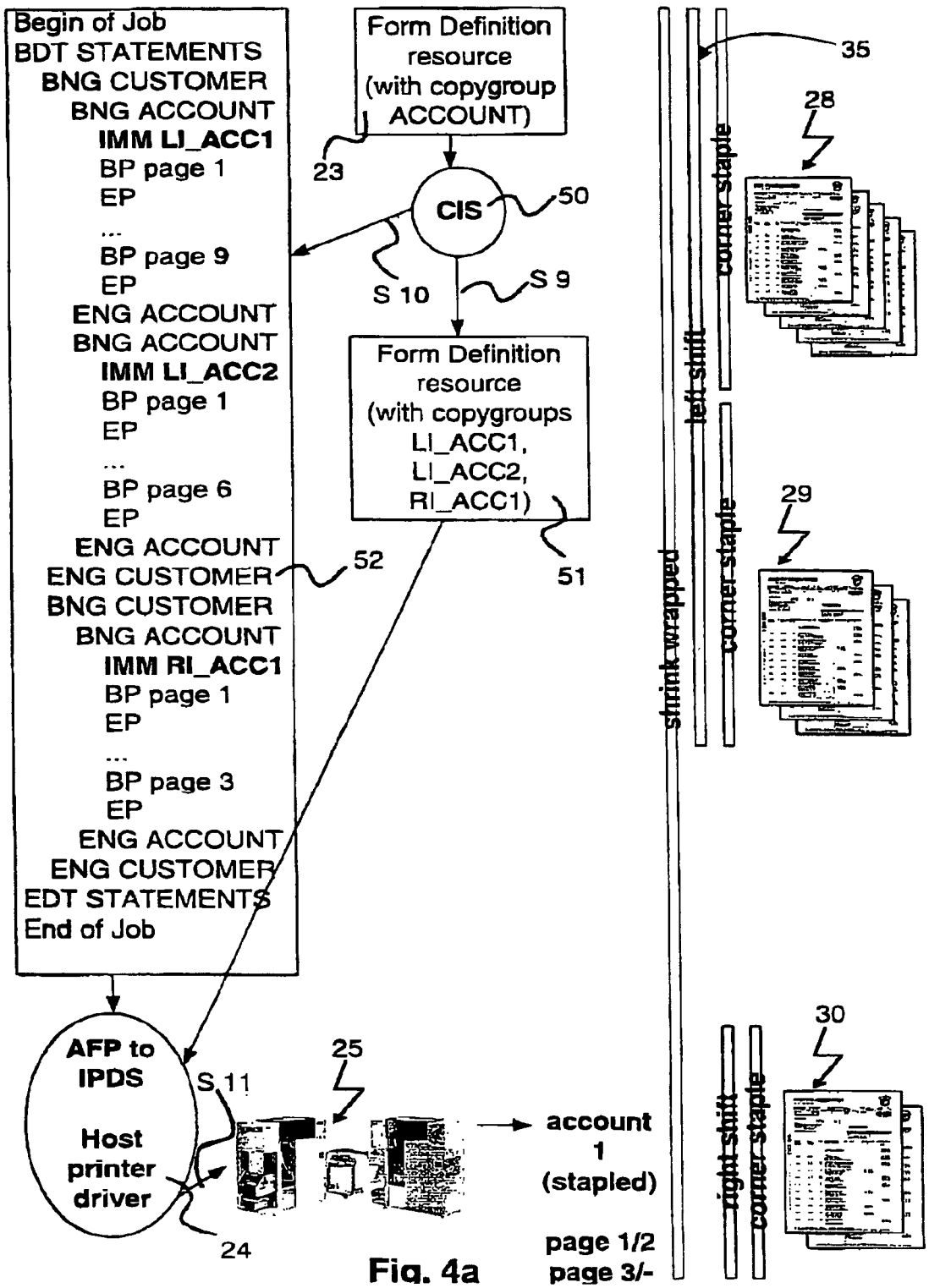

Using the input print data file 22 and the input formdef file 23, which have already been the basis for the specifications of FIGS. 2 and 3, in FIG. 4 it is shown how an output print data stream is generated in the data format AFP. For this, it is initially helpful once to consider the data structure in the input print data file 22 in more detail. With the bracket 40, all data of the print data file, the largest coherent range of the print data from the command "beginning of job" to the command "end of job", are bracketed. The AFP print data stream is then divided up into subsequent sub-ranges that respectively signal more or less large documents belonging together such as, for example, mail pieces or pages. The preferred embodiment utilizes this range-oriented structure. In the example of the print data file 22, a first range is opened via the command "BNG Customer" and closed via the command "ENG Customer". Bracket 41 shows this range. Within this range, there are sub-ranges "Account" that are respectively begun or ended via the commands "BNG Account" and "ENG Account"; see brackets 42 and 43. Within the account range, various pages are then respectively structured in turns with the commands "BP" and "EP" for beginning of the page and end of the page.

The second customer range that is designated with the bracket 44 is located on the same hierarchy level as the customer commands, which were designated with the bracket 41. It also has a sub-region "Account" that is comprised by the bracket 45. In order to also map this data structure of the print data file in the control file 46, their levels are defined with the commands "Define level". The highest level (Level_A) is thus the entire print data file 22 that is encompassed with bracket 40. The highest range (Customer) of the print data file 22 is subdivided into a first customer range that is encompassed with bracket 41 and a second customer range that is encompassed with bracket 44. Corresponding to the desired processing schema for the documents stored there (see FIGS. 1 and 2), whereby the documents of the first customer should be offset to the left and the documents of the second customer should be offset to the right, two different levels must be defined within this range level in the control file 46, namely one level that corresponds to all uneven-numbered calculations within the first group level (see also customer bracket 41) and a second level that corresponds to all even-numbered calculations within the group level 1 (compare also second customer bracket 44).

Finally, in the control file 46 the various finishing operations are associated with the previously-defined levels: in the example of FIG. 4, the level "Level_A" with the finishing job "Shrink", the level "Level_B1" with the finishing job "Left/Shift" and the level "Level_B2" with the finishing job "Right/Shift" and the level "Level_C" with the finishing job "Staple".

The control file 46 completed in step S7 contains three data ranges, namely a first data range 47 in which are defined the various finishing operations that can be executed by print pre-processing or post-processing devices, a definition range 48 for levels in which are defined various levels of the structured input data stream 22, and a device range 49 for the associations that should be made between the finishing operations 47 and the defined levels 48 or which finishing operation commands should be inserted into which levels of the structured data stream file 22. As soon as the user has completed the control file 46, with the CIS computer program module 50 in step S9 a new formdef file 51 can be automatically created from the print data file 22, the formdef file 23 and the control file 46, and in step S10 a new print data file 52 can be simultaneously generated. The new copygroups LI_ACC1, LI_ACC2 and RI_ACC1 are generated from the formdef file 23 and the finishing operations specified in the control file 46. Furthermore, the CIS computer program module 50 effects that the modified print data file is generated from the print data file 22 and the definition range 48 for levels as well as the definition range 49 for associations. For this, the CIS computer program module 50 (CIS stands for Converting Indexing and Sorting), see also the specification regarding FIG. 1), examines the input print data file 22 with regard to its logical, hierarchical structure and assigns the levels to the various data ranges, i.e. the level Level_A to the entire document corresponding to the bracket 40, Level_B1 to the data range of the bracket 41, etc. Using this association and the associations made in the definition range 49, corresponding finishing commands that have been defined in the range 47 can be inserted into the print data file 22 at exactly the right positions, such that the print data file 52 is created. The CIS computer program module 50 thus uses the information that are contained in the control file 46 and modifies the medium maps "Account" that were contained in the original formdef file 23 and their corresponding calls in the original print data file 22 "IMM Account" and modify these corresponding to the henceforth refined, additional finishing commands. The conversion occurs automatically via the CIS computer program module 50 and thus guarantees an inherently logical result tuned or synchronized to one another.

The resulting new formdef file 51 contains new medium maps, whereby the designations "LI_ACC1", etc. are purely voluntary and can be completely automatically as well as randomly generated by the CIS computer program module. However, a designation assigned once is then retained. In all cases, the new medium maps replace the preceding ACCOUNT medium maps of the original formdef file 23.

Further details of the CIS computer program module 50 can be learned from WO 01/77807 A2 and PCT/EP02/05299, which is herewith again explicitly incorporated into the present specification. An important functionality of the CIS computer program module 50 that is addressed in the older WO publication '807 is the normalization of the data of the input print data file 22. It is converted and, if applicable, re-sorted in step S10 such that identical job types and/or identical customers are mutually printed out in succession, such that the subsequent processing of the documents (stacking, enveloping, stapling, etc.) is simplified.

The modified print file 52 and the modified formdef file 51 are supplied in step S11 to a host printer driver 24 that conveys the AFP data stream in an APDS data stream to an IPDS- and UP$^3$I-capable printer. The UP$^3$I commands that are contained in the medium maps are converted into corresponding IPDS triplets before they are sent to the printer (step S11).

As already in FIGS. 2 and 3, in the exemplary embodiment of FIG. 4 the print good generated with the method is also comprised of five pages for customer 1 and its first account, three pages for the second account of the customer 1 and two pages for the customer 2. This time, the pages are stacked, shifted and film-welded as this has been requested by the user.

Due to the structural correspondence between input file 22 and control file 46, the effort to introduce auxiliary device functionalities (such as UP$^3$I functions) into an existing application of a resource-structured print data stream is relatively small. Via the automation, a secure conversion can occur independent of the size of the application (number of the documents, pages and/or mail pieces) and the number of the medium maps in the form definition file. Furthermore, the specifications of the original form definition file 23 are not necessary, such that the AFP user that wants to implement a UP$^3$I data extension does not need any access to the original control file with which the original formdef file 23 was generated. An AFP user who wants to implement additional device functionalities in the data stream also needs no access to an original PPFA control file or to the application program that has originally generated the data stream, because he only inserts the additional commands into the data stream, including the formdef file 23, on a comfortable operator interface.

In step S11, the modified print data file 52 and the modified formdef file 51 are converted by the host printer driver 24 into an IPDS data stream, and this IPDS print data stream is output to the printing system 25 for output. In step S12, this produces three documents 28, 29 and 30 as they have already been explained in detail using FIGS. 2 and 3.

In the exemplary embodiments cited above, AFP print data have respectively been enhanced with finishing commands in order to subject documents to a print pre-processing and/or a print post-processing in various manners. However, the preferred embodiment is suitable not only for AFP print data streams or corresponding resource-structured input files but rather can, for example, also be applied for what is known as line data that are inherently unstructured. By means of a suitable computer program module, for example the known computer program ACIF by the company IBM or the computer program "CIS" 50 already used in the present embodiment, which is also explained in detail in WO 01/77807, such line data can be converted such that the line file is converted into a structured file by means of what is known as a pagedef file. This structured file then corresponds to the print data file 22 of the exemplary embodiments illustrated above and can in turn, by means of a corresponding formdef file 23, be automatically converted with the preferred embodiment into an output file 52 enhanced with finishing commands.

In addition to line data, Extendable Markup Language data (XML data) can also be enhanced with finishing operations. The XML standard is primarily a well-known standard in the field of Internet pages. Personalized Printer Markup Language data (PPML data) can also be enhanced with finishing commands with the present invention. Finally, it is also possible to process further known types of document data streams such as, for example, data of the Printer Control Language (PCL) in the manner of the preferred embodiment. Finishing commands can thus already be contained in the original data stream (PCL), the PCL data stream can be converted into an AFP data stream and the already-existing finishing commands can thereby be adopted and optionally enhanced with additional finishing commands. The enhancement then occurs in the manner of the preferred embodiment.

Finally, with the preferred embodiment it is also conceivable to effect a data reduction instead of a data enhancement, i.e. to reduce a print data input file that contains finishing operations by these operations. The fundamental workflow of the preferred embodiment, with the creation of a control file that defines specific levels and assigns certain finishing operations to these levels, is thereby maintained. Only the removal of finishing commands is established instead of the addition of finishing commands. It can just as well be provided to exchange finishing commands, whereby, for example, finishing commands that set up on a specific type or a specific version of finishing device, are to be replaced by correspondingly changed types or versions. This can in particular be advantageous when a file to be printed contains finishing commands of a specific standard (for example UP$^3$I) and should be processed on a system that does not fulfill this standard, for example is not UP$^3$I-capable. Furthermore, the preferred embodiment enables finishing commands or data of a first standard to be replaced by finishing commands or data of a second standard, for example when an application should run on a new system.

With the preferred embodiment, the fundamentals are achieved to very flexibly deal with print data streams in more or less complex print production systems in which the data, documents, or recording media are processed in a plurality of devices.

Given the conversion of a PCL or PS (Postscript) data stream into AFP, it can additionally be provided that the formdef file is created in a course with the conversion of the print data file, i.e. it is formed "on the fly", so to speak. The modified print data file and the modified formdef file for processing of the print job in a printing system with finishing commands can then directly and very quickly occur with both of these files (formdef file and print data file) and the inventive control file generated by the user.

The preferred embodiment can in particular be realized as a computer program (software). It can therewith be distributed as a computer program module, as a file on a data medium such as a diskette or CD-ROM, or as a file via a data or communication network. Such and comparable computer program products or computer program elements are embodiments. The procedure of the preferred embodiment can be used in a computer, in a print device and/or in a printing system with upstream or downstream data processing devices, in particular when the computer program runs on a suitable computer and there effects a method procedure of the preferred embodiment. It is thereby clear that corresponding computers on which the preferred embodiment is used can comprise further known technical devices such as input devices (keyboard, mouse, touchscreen), a microprocessor, a data or control bus, a display device (monitor, display) as well as a working storage, a fixed disc storage and a network card.

While a preferred embodiment has been illustrated and described in detail in the drawings and foregoing description, the same is to be considered as illustrative and not restrictive in character, it being understood that only the preferred embodiment has been shown and described and that all changes and modifications that come within the spirit of the invention both now or in the future are desired to be protected.

We claim as our invention:

1. A method for enhancement with a print data processing computer of an input document data stream which comprises at least one input format formdef file as an advanced function presentation (AFP) format definition resource file (formdef) comprising format definitions and an input document data file structured in ranges and sub-ranges and containing variable data, comprising the steps of:

in a control file defining finishing commands and enhancing the data stream with said finishing commands, said control file being generated by analyzing a data structure of the input document data file and mapping said data structure into said control file, and said finishing commands being automatically inserted into said formdef file which are invoked instead of original calls contained in the document data file;

in the control file also defining document levels that correspond to at least one of the ranges and the sub-ranges of the input document data file, the document levels on which specific ones of the finishing commands are to be applied being defined independent of said data structure of the document input file, said data processing computer comprising a first computer program module providing a graphical user interface by which a user specifies said levels within the data stream;

in the control file also by use of said graphical user interface the user also associating the finishing commands with the levels, and registering which finishing commands are executed in which levels;

in the control file also associating a first of the finishing commands with one of the ranges and associating a second of the finishing commands with one of the sub-ranges; and using the control file, input format file, and the input document data file, with said processing computer automatically generating and outputting by a second computer program module to a printing device for creating a printed document an output format file as an advanced function presentation (AFP) format definition resource file (formdef) that contains the finishing commands in callable groups, the output format formdef file being provided with modified medium maps relative to the input formdef file, and an output document data file containing the variable data and group calls associated by at least one of range-by-range and sub-range-by-sub-range.

2. A method according to claim 1 wherein the output document data file is fed to a data production system that comprises said printing device and at least one device for processing of a print product at least one of before and after the printing event, and wherein the finishing commands activate at least one of the devices for processing of the print product at least one of before and after said printing event.

3. A method according to claim 1 wherein the data of the output format file and the data of the output document file are generated corresponding to one another with the second computer program module.

4. A method according to claim 1 wherein at least one of said input document data stream and an output document data stream comprising said output document data file is resource-structured and comprises a page description language data stream.

5. A method according to claim 4 wherein the output document file comprises a print file with variable print data, and the second computer program module enhances the variable data with calls of said medium maps of the output formdef file.

6. A method according to claim 1 wherein a non-resource-structured file is read in and converted into a resource-structured input data file.

7. A method according to claim 6 wherein the non-resource-structured file comprises a line data file.

8. A method according to claim 6 wherein the same computer program module as is used to prepare the resource-structured input file is used to convert the non-resource-structured file.

9. A non-transitory computer-readable medium comprising a computer program tangibly embodied on the medium for enhancement with a print data processing computer of an input document data stream which comprises at least one input format formdef file as an advanced function presentation (AFP) format definition resource file (formdef) comprising format definitions and an input document data file structured in ranges and sub-ranges and containing variable data, said program when executed with said processing computer performing the steps of:

in a control file defining finishing commands and enhancing the data stream with said finishing commands, said control file being generated by analyzing a data structure of the input document data file and mapping said data structure into said control file, and said finishing commands being automatically inserted into said formdef file which are invoked instead of original calls contained in the document data file;

in the control file also defining document levels that correspond to at least one of the ranges and the sub-ranges of the input document data file, the document levels on which specific ones of the finishing commands are to be applied being defined independent of said data structure of the document input file, said data processing computer comprising a first computer program module providing a graphical user interface by which a user specifies said levels within the data stream;

in the control file also by use of said graphical user interface the user also associating the finishing commands with the levels and registering which finishing commands are executed in which levels;

in the control file also associating a first of the finishing commands with one of the ranges and associating a second of the finishing commands with one of the sub-ranges; and using the control file, input format file, and the input document data file, with said processing computer automatically generating and outputting by a second computer program module to a printing device for creating a printed document an output format file as an advanced function presentation (AFP) format definition resource file (formdef) that contains the finishing commands in callable groups, the output format formdef file being provided with modified medium maps relative to the input formdef file, and an output document data file containing the variable data and group calls associated by at least one of range-by-range and sub-range-by-sub-range.

10. A system for enhancement of an input document data stream which comprises at least one input format formdef file as an advanced function presentation (AFP) format definition resource file (formdef) comprising format definitions and an input document data file structured in ranges and sub-ranges and containing variable data, comprising:

a print data processing computer having a control file defining finishing commands and enhancing the data stream with said finishing commands, said control file being generated by analyzing a data structure of the input document data file and mapping said data structure into said control file, and said finishing commands being automatically inserted into said formdef file which are invoked instead of original calls contained in the document data file;

the control file also defining document levels that correspond to at least one of the ranges and the sub-ranges of the input document data files, the document levels on which specific ones of the finishing commands are to be applied being defined independent of said data structure of the document input file, said data processing computer comprising a first computer program module providing a graphical user interface by which a user specifies said levels within the data stream;

the control file, also by use by the user of said graphical user interface also associating the finishing commands with the levels and registering which finishing commands are executed in which levels;

the control file also associating a first of the finishing commands with one of the ranges and associating a second of the finishing commands with one of the sub-ranges; and said processing computer with a second computer program module using the control file, input format file, and the input document data file to automatically generate and output to a printing device for creating a printed document an output format file as an advanced function presentation (AFP) format definition resource file (formdef) that contains the finishing commands in callable groups, the output format formdef file being provided with modified medium maps relative to the formdef file, and an output document data file containing the variable data and group calls associated by at least one of range-by-range and sub-range-by-sub-range.

11. A system according to claim 10 wherein the output document data file is fed to a data production system that comprises said printing device and at least one device for processing of a print product at least one of before and after the printing event, and wherein the finishing commands activate at least one of the devices for processing of the print product at least one of before and after a printing event.

12. A system according to claim 10 wherein the data of the output format file and the data of the output document file are generated corresponding to one another with the second computer program module.

13. A system according to claim 10 wherein at least one of said input document data stream and an output document data stream comprising said output document data file is resource-structured and comprises a page description language data stream.

14. A system according to claim 13 wherein the output document file comprises a print file with variable print data, and the second computer program module enhances the variable data with calls of the medium maps of the output formdef file.

15. A system according to claim 10 wherein a non-resource-structured file is read in and converted into a resource-structured input data file with a third computer program module.

16. A system according to claim 15 wherein the non-resource-structured file comprises a line data file.

17. A system according to claim 15 wherein said third computer program module used to prepare the resource-structured input file is also used to convert the non-resource-structured file.

* * * * *